United States Patent
Bell

(10) Patent No.: US 10,209,520 B2
(45) Date of Patent: *Feb. 19, 2019

(54) NEAR EYE DISPLAY MULTI-COMPONENT DIMMING SYSTEM

(71) Applicant: Microsoft Technology Licensing, LLC, Redmond, WA (US)

(72) Inventor: Cynthia S. Bell, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 77 days.

This patent is subject to a terminal disclaimer.

(21) Appl. No.: 15/436,086

(22) Filed: Feb. 17, 2017

(65) Prior Publication Data

US 2018/0188538 A1     Jul. 5, 2018

Related U.S. Application Data

(63) Continuation-in-part of application No. 15/395,127, filed on Dec. 30, 2016.

(51) Int. Cl.
*G09G 5/00* (2006.01)
*G02B 27/01* (2006.01)
(Continued)

(52) U.S. Cl.
CPC ........... *G02B 27/0172* (2013.01); *G02B 5/23* (2013.01); *G02F 1/13306* (2013.01);
(Continued)

(58) Field of Classification Search
CPC ......... G06F 3/013; G06F 1/163; G06F 3/012; G06F 3/005; G06F 3/147; G06F 3/0304; G06F 3/011; G02B 27/0172; G02B 2027/0178; G02B 2027/0138; G02B 2027/0118; G02B 27/017; G02B 27/0093; G02B 5/30; G02B 2027/0123; G02B 5/28; G02B 2027/012; G02B 5/003;
(Continued)

(56) References Cited

U.S. PATENT DOCUMENTS 7,710,655 B2   5/2010   Freeman et al.
7,893,890 B2 * 2/2011   Kelly ............... G02B 27/01
                                                        345/8

(Continued)

FOREIGN PATENT DOCUMENTS

WO   2015058625 A1   4/2015

OTHER PUBLICATIONS

Benko, et al., "FoveAR: Combining an Optically See-Through Near-Eye Display with Spatial Augmented Reality Projections", In Proceedings of the 28th Annual ACM Symposium on User Interface Software & Technology, Nov. 8, 2015, pp. 129-135.
U.S. Appl. No. 15/395,127, filed Dec. 30, 2016.
"Non Final Office Action Issued in U.S. Appl. No. 15/395,127", dated Jul. 12, 2018, 18 Pages.

*Primary Examiner* — Duc Q Dinh
(74) *Attorney, Agent, or Firm* — Ranjeev Singh; Singh Law, PLLC

(57) ABSTRACT

A system and method are disclosed for controlling an amount of ambient light transmitted to the eye of a wearer through an NED device. A passive component such as a photochromic coating may be applied to a visor of the NED device to block light. An active component may be included to augment the light dimming capabilities of the passive component.

18 Claims, 10 Drawing Sheets

(51) Int. Cl.
*G02F 1/1335* (2006.01)
*G02F 1/133* (2006.01)
*G02B 5/23* (2006.01)
*G09G 3/34* (2006.01)
*G09G 3/36* (2006.01)
*G02F 1/137* (2006.01)

(52) U.S. Cl.
CPC ..... G02F 1/133528 (2013.01); G09G 3/3406 (2013.01); G09G 3/36 (2013.01); *G02B 2027/014* (2013.01); *G02B 2027/0118* (2013.01); *G02B 2027/0138* (2013.01); *G02B 2027/0174* (2013.01); *G02F 1/13725* (2013.01); *G09G 2320/066* (2013.01); *G09G 2320/0626* (2013.01); *G09G 2360/144* (2013.01)

(58) Field of Classification Search
CPC .. G02B 27/281; G02B 27/01; G02B 19/0038; G02B 5/1842
USPC .................................................. 345/7–9, 102
See application file for complete search history.

(56) References Cited

U.S. PATENT DOCUMENTS

| | | | |
|---|---|---|---|
| 8,724,206 B2 | 5/2014 | Spitzer et al. | |
| 9,087,471 B2 | 7/2015 | Miao | |
| 9,182,596 B2 | 11/2015 | Border et al. | |
| 9,223,152 B1 | 12/2015 | Kress et al. | |
| 9,939,643 B2* | 4/2018 | Schowengerdt | H04N 13/383 |
| 2010/0157400 A1 | 6/2010 | Dimov et al. | |
| 2012/0050141 A1 | 3/2012 | Border et al. | |
| 2012/0212398 A1 | 8/2012 | Border et al. | |
| 2013/0286053 A1 | 10/2013 | Fleck et al. | |
| 2013/0328925 A1 | 12/2013 | Latta et al. | |
| 2014/0111864 A1 | 4/2014 | Margulis et al. | |
| 2015/0260991 A1 | 9/2015 | Bhardwaj et al. | |
| 2015/0286057 A1* | 10/2015 | Walsh | G02B 27/0172 345/156 |
| 2016/0055822 A1 | 2/2016 | Bell | |
| 2016/0306215 A1* | 10/2016 | Chen | G02F 1/133514 |

* cited by examiner

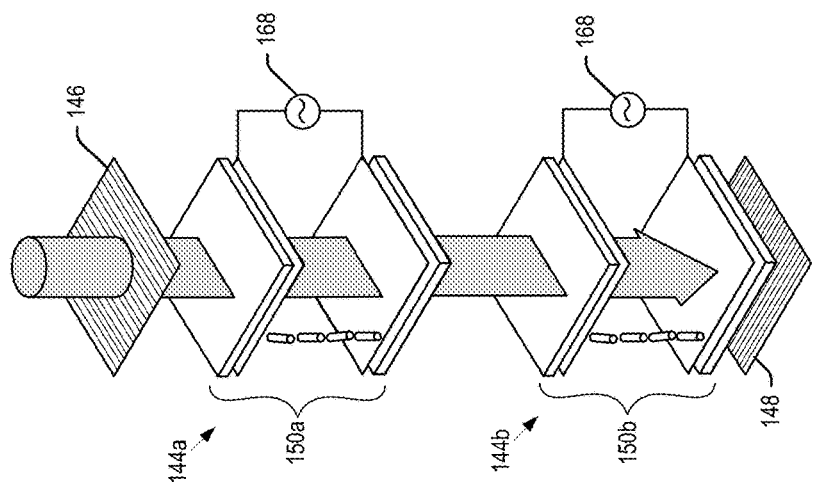
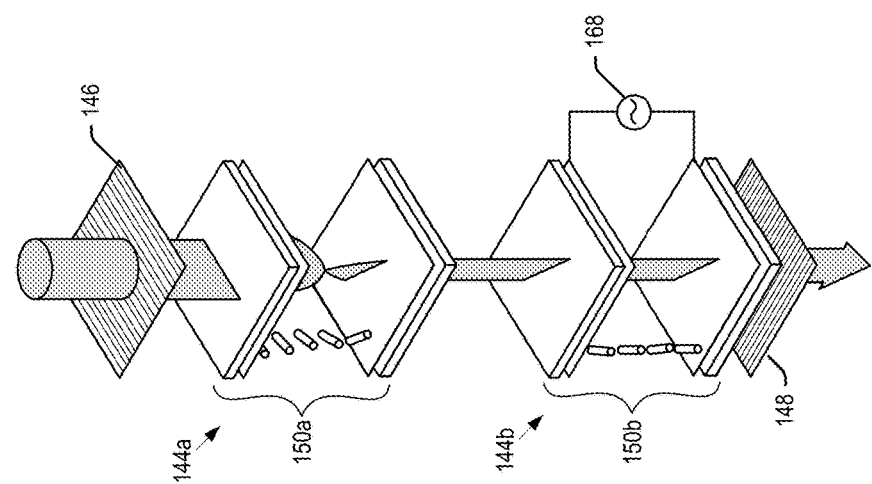
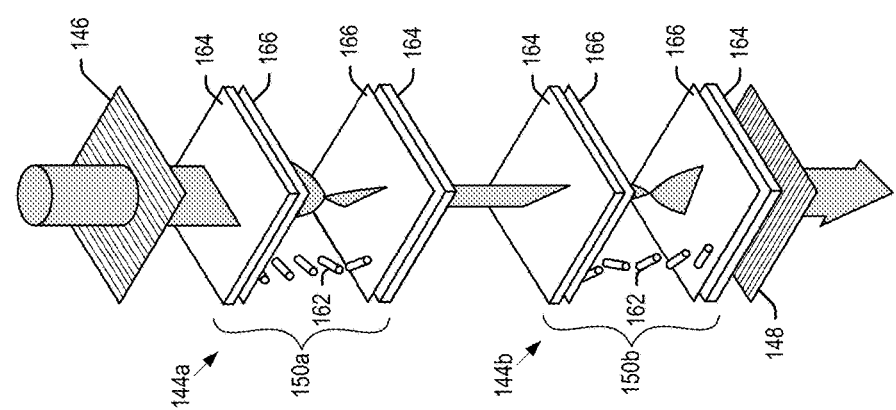
Fig. 8
Fig. 7
Fig. 6

NEAR EYE DISPLAY MULTI-COMPONENT DIMMING SYSTEM

CLAIM OF PRIORITY

This application is a continuation-in-part of U.S. patent application Ser. No. 15/395,127 filed Dec. 30, 2016 entitled "NEAR EYE DISPLAY MULTI-COMPONENT DIMMING SYSTEM", which application is incorporated by reference herein in its entirety.

BACKGROUND

Near-eye display (NED) devices used for example in augmented reality are ideal for use both indoors and outdoors. However, ambient illumination levels span a wide range, from 10 lux in dim interiors to 120,000 lux in outdoor direct sunlight. NED devices must insure AR hologram visibility for all ambient brightness levels. However, as NED devices are used in increasingly brighter environments, e.g. outdoors, display power consumption can become problematic. Even at high power levels, AR holograms may appear washed out in comparison to real world objects in the bright ambient environment. Additionally, especially in bright environments, real world objects and backgrounds may be visible through the AR hologram, giving them a ghostly, less realistic appearance. Moreover, some external light sources passing through NED viewing optics can be optically transformed into visible artifacts that may appear as brightly colored rainbows and/or colored ghosts.

SUMMARY

Embodiments of the present technology relate to a system and method for controlling an amount of ambient light transmitted to the eye of a wearer through an NED device. Embodiments of the present technology may include both passive and active components for controlling transmitted light. A passive component may comprise a photochromic coating applied to a visor of the NED device. The photochromic coating may be responsive to UV light, for example from sunlight, to darken and limit the amount of light which passes through the visor.

An active component may comprise a bi-layer monochromatic dimming panel assembly positioned behind hologram forming optical assemblies. The dimming panel assembly can reduce ambient light viewed through the NED device indoors or outdoors. A pixel level opacity mask may be developed each frame which may be used by the dimming panel assembly to form dark masks behind augmented reality (AR) holograms and semi-dark masks that create the appearance of drop shadows. The positions of bright light sources in a scene can also be identified, and those positions defined in the pixel level opacity mask so that the dimming panel assembly can block light from those bright light sources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 6-8 are perspective views of a pixel of a monochromatic dimming panel assembly selectively transmitting, partially transmitting or blocking light from passing there-through.

FIGS. 11-12 are perspective views of a pixel of a monochromatic dimming panel assembly selectively transmitting or blocking light from passing there-through.

DETAILED DESCRIPTION

Figure 1:
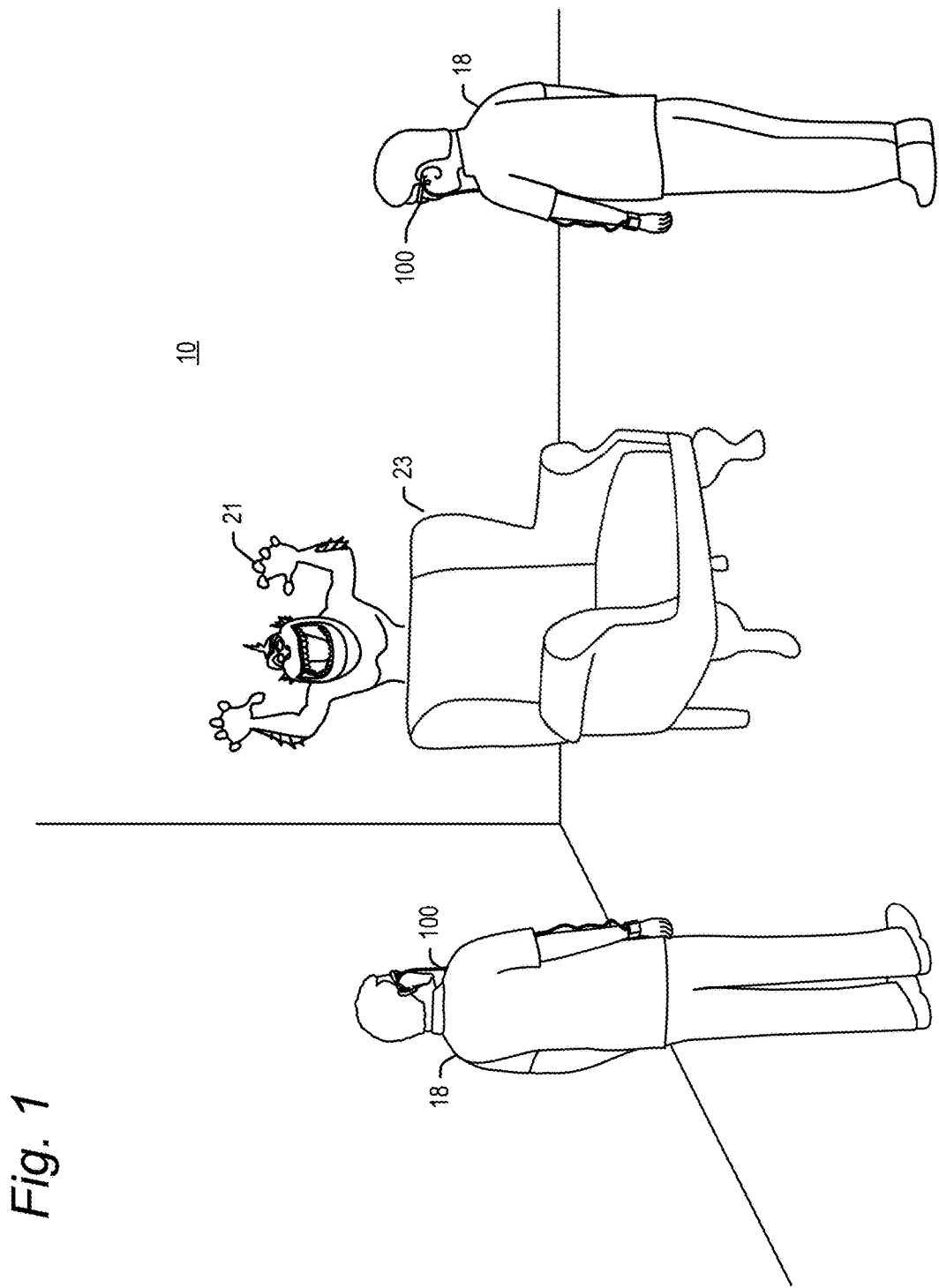
FIG. 1 is an illustration of a virtual reality environment including real and virtual objects.

Embodiments of the present technology will now be described with reference to the figures, which in general relate to a system for controlling an amount of ambient light transmitted to the eye of a wearer through an NED device. Embodiments of the present technology may include both passive and active components for controlling transmitted light. A passive component may comprise a photochromic coating applied to a visor of the NED device. The photochromic coating may respond sunlight or other UV light sources to darken and limit the amount of light which passes through the visor.

An active component may comprise a pixelated monochromatic dimming panel assembly comprised of a pair of spaced liquid crystal (LC) panels sandwiched between crossed (orthogonal) polarizer panels. The dimming panel assembly can limit the amount of light which gets transmitted there-through in response to a voltage applied to the one or more LC panels. The applied voltage may be increased or decreased to maintain the luminance of a scene at controlled levels regardless of whether the NED device is used outdoors in other bright environments, or indoors in darker environments. In embodiments, as explained below, the system can compare a desired light level to the actual amount of light passing through the visor, generate an alternate drive image and deliver it to the dimming panel assembly resulting in the desired light level transmitted through the NED device to the eyes of a wearer.

Additionally, a processor within NED device develops a pixel level opacity mask, based on feedback from cameras and sensors in the NED, which designates which pixels in the dimming panel assembly block or partially block light. In examples, the opacity mask can be used to block light from pixels behind AR holograms, giving the holograms a more substantial, realistic appearance. The pixel opacity mask may also take into account light sources and shadows in the scene, to apply virtual shadows to AR holograms further enhancing the realistic appearance of the holograms.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal," and forms thereof, as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25%.

FIG. 1 illustrates an augmented reality environment 10 for providing an augmented reality experience to users by fusing virtual content 21 with real content 23 within each user's field of view. FIG. 1 shows users 18 wearing an NED device 100 for presenting the augmented reality experience to the users. The description below focuses on active and passive components for dimming light transmitted through an NED device. Additional components of the NED device used to generate an augmented reality experience but not directly related to the light dimming components of the present technology are not described. However, such additional components are described for example in U.S. Patent Publication No. 2013/0326364 entitled "Position Relative Hologram Interactions," published on Dec. 5, 2013. It is further understood that one or more of the light dimming components according to the present technology may be used in a wide variety of imaging devices other than those used in an NED.

Figure 3:
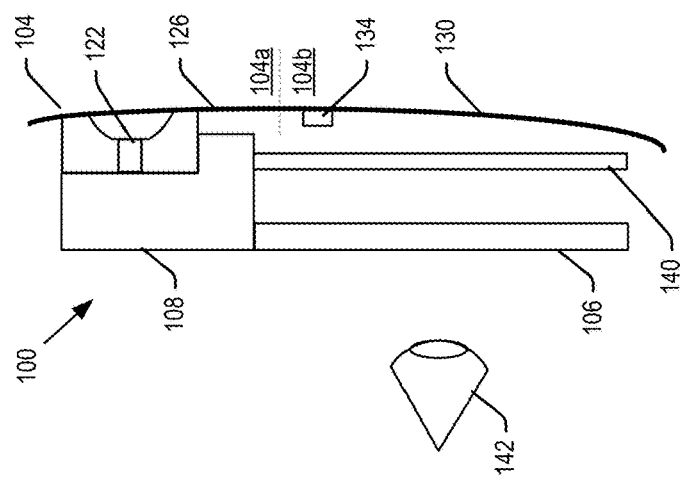
FIGS. 2 and 3 are front and cross-sectional side views, respectively, of a head mounted display device including active and passive light dimming components according to embodiments of the present technology.
Figure 2:
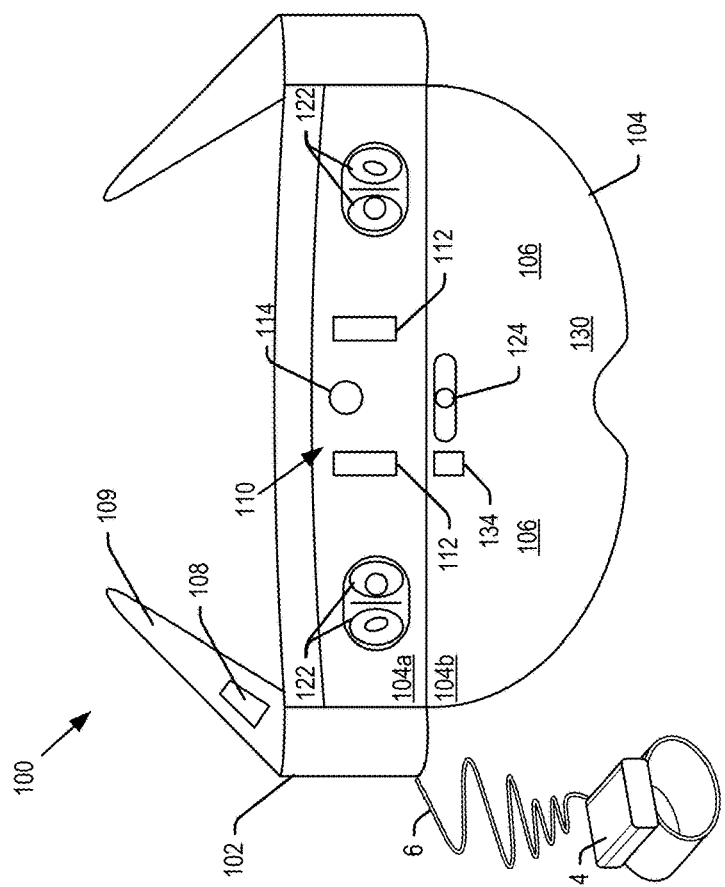

As shown in the front and cross-sectional side views of FIGS. 2 and 3, an NED device 100 may include glasses frame 102 supporting a visor 104 to be worn in front of a user's eyes. The visor 104 may for example be formed of injection-molded polycarbonate, though it may be formed of other plastics or glass in further embodiments. The device 100 may further include optical assemblies 106 including lenses and optical waveguides for displaying AR holograms and for transmitting light from the environment around the NED device to the eyes of a wearer. Control electronics 108 may be mounted in the frame 102 (in the temple arms 109 and/or adjacent the visor 104 as shown) to control the operation of the components of head mounted display device 100. In embodiments, the control electronics 108 may comprise a processor performing all processing and control functions of the NED device 100. In further embodiments, at least some of the processing and/or control may be performed by a processor within a separate processing unit 4, connected to the NED device 100 for example via a flexible wire 6 as shown or via wireless communication. As noted, in embodiments, the separate processing unit 4 may be omitted.

The NED device 100 may further include a variety of cameras mounted behind and adjacent to the visor 104. The cameras may include for example a depth camera 110 having a pair of light sources 112 and an optical sensor 114 which may be an image sensor. The light sources 112 may be semiconductor devices such as for example laser diodes emitting pulsed light in the IR wavelengths. The optical sensor 114 may be configured to capture a depth image of an area in the field of view of the sensor 114. The depth image may include a two-dimensional (2-D) pixel array of the captured area where each pixel in the 2-D pixel array may calculate a distance of an object in the captured area from the depth sensor 110. The depth image may capture depth values of the area via any suitable technique including, for example, gated and phase modulated time-of-flight, structured light, stereo image, or the like.

The cameras shown in FIGS. 2 and 3 may include one or more head tracking cameras 122. Using methods such as simultaneous location and mapping (SLAM), the cameras are able to register key features within the scene, and determine a change in head position from frame to frame of image data captured by the head tracking cameras, and an estimation of absolute head position. While four head tracking cameras are shown, there may be more or less than that in further embodiments.

The cameras shown in FIG. 2 may further include a video camera 124 for capturing video or still images of the scene. While one video camera 124 is shown. There may be more than one camera 124 in further embodiments. Although not shown, the NED device 100 may further include eye tracking cameras for tracking the position of a user's eyes as well as a position of the NED device relative to the user's eyes. It is understood that the NED device 100 may include other cameras in addition to or instead of those described above.

The visor 104 may have an upper portion 104a coated with a dye 126 which is opaque to light in the visible wavelength range but at least partially transparent to light in the infrared wavelengths of the light sources 112. The dye 126 may be omitted from a lower portion 104b of the visor 104 (worn in front of a user's eyes).

In accordance with a first aspect of the present technology, the lower portion 104b of the visor 104 may be coated with photochromic coating 130 which responds by darkening upon receiving certain wavelengths of light. The photochromic coating 130 may be transparent in the absence of light, or when the wavelengths of light to which the coating is sensitive drop below some threshold level.

In embodiments, the photochromic coating may respond to UV wavelengths, such as those found in sunlight, but it may respond to other wavelengths of light in further embodiments. In one example, the photochromic coating 130 may be a polymer film comprising organic photochromic molecules or compounds such as oxazines and/or naphthopyrans absorbed into polyurethane. The coating 130 may be about 150 μm thick, though it may be thinner or thicker in further embodiments. Instead of being a coating, at least the lower portion 104b of the visor 104 may be formed as a photochromic lens, where the photochromic light dimming molecules and/or compounds are incorporated into the visor itself.

The amount by which the photochromic coating 130 darkens may vary with the amount light incident thereon. In bright sunlight, the coating 130 can darken to 15% transmittance. This would reduce direct sunlight from 120,000 lux to 18,000 lux. Indoors, the same coating 130 may be 85% transmissive, and even inactive. The photochromic layer 130 is passive, in that it is capable of lowering light transmission in bright conditions without any power source.

The amount by which photochromic materials dim light may vary with temperature and age of the photochromic material. Additionally, even when the photochromic coating 130 is performing to specification, it may be desirable to measure the amount of light transmitted through the visor 104, so that further dimming to a desired level may be performed by the pixelated monochromatic dimming panel assembly 140, explained below. As such, in embodiments, the NED device 100 may further include a light transmittance feedback circuit 134 for measuring the amount of light transmitted through the visor 104 including the photochromic material or coating 130. Suitable chips for implementing the feedback circuit 134 include the Taos3103 or Intersil ISL29125 light sensor ASICs. Other feedback circuit chips and systems are known and may be used.

In accordance with further aspects of the present technology, the NED device 100 may additionally include pixelated monochromatic dimming panel assembly 140 (also referred to herein as simply the dimming panel assembly 140). The dimming panel assembly 140 may be considered an active system, in that it works with a power source, and is used together with the above-described passive system to control the amount of ambient light transmitted to the eyes of a wearer.

As seen in FIG. 3, the dimming panel assembly 140 may be positioned behind the optical assemblies 106, i.e., further from the wearer's eyes 142 than the optical assemblies 106 and between the optical assemblies 106 and the visor 104. In embodiments, there may be a separate dimming panel assembly 140 for each of the left and right eyes, though there may be a single dimming panel assembly 140 for both eyes in further embodiments. In embodiments, the dimming panel assembly may be spaced 1 mm to 2 cm away from the optical assemblies 106, though this spacing may be smaller or larger in further embodiments.

Further details of the dimming panel assembly 140 will now be explained with reference to FIGS. 4-12. In general, the dimming panel assembly may be used in at least three ways. First, where it is determined that the scene captured by the NED device 100 as a whole is too bright, the dimming panel assembly may be used for a generalized reduction in the amount of light transmitted across all pixels of the dimming panel assembly. Second, where there are for example AR holograms in a scene, the dimming panel assembly may variably adjust the amount of light transmitted on a pixel-by-pixel basis based on positions specified in an opacity mask. The opacity mask may be a digital grayscale image. It gets converted to per-pixel drive voltages by a display driver ASIC. Using the opacity mask, pixels behind an AR hologram may be driven by voltages that cause ambient light to be blacked out, and pixels around the AR hologram may be dimmed to create virtual drop shadows, thus providing a good contrast and realistic appearance to the AR hologram. Third, where the NED device 100 is used in a virtual reality setting (no real world images), the dimming panel assembly may black out all pixels so that just AR holograms and virtual scenery are visible to the NED device wearer. The operation of the pixel dimming assembly for each of these examples is provided below.

Figure 4:
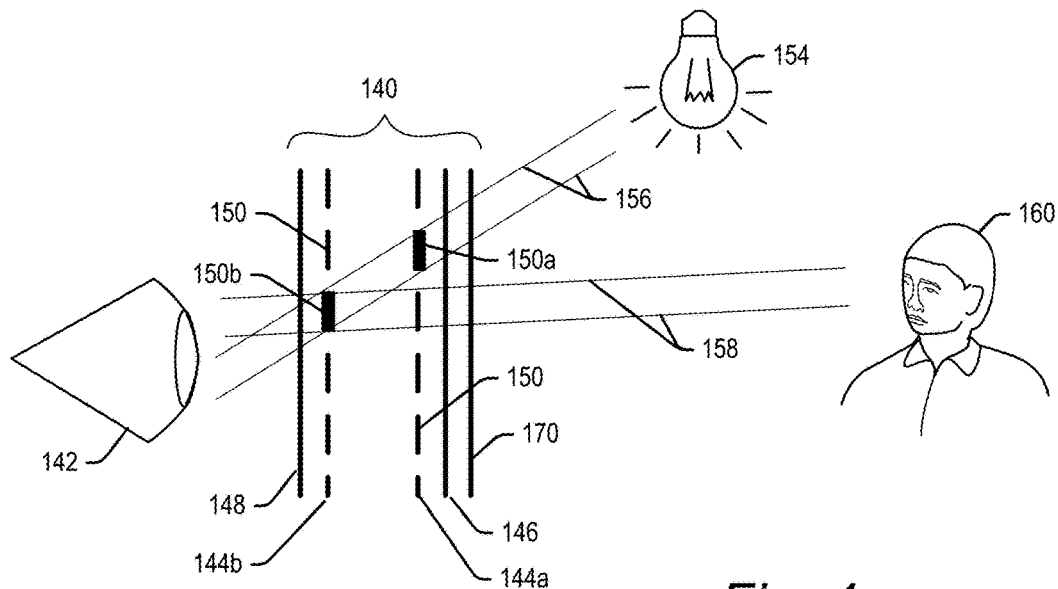
FIG. 4 is an illustration of a pixelated monochromatic dimming panel assembly blocking selected light rays from reaching the eyes of the wearer of an NED device.

FIG. 4 illustrates the dimming panel assembly 140 of the NED device 100, with the optical assemblies 106 and visor 104 omitted for clarity. The dimming panel assembly 140 may in embodiments include a pair of spaced apart pixelated LC panels 144a and 144b (together referred to as LC panels 144). The pair of LC panels 144 are sandwiched between first and second linear polarizers 146 and 148. The LC panels 144a and 144b may be spaced apart from each other 500 μm to 1500 μm, and for example 1000 μm, though they may be spaced closer or farther than this range in further embodiments. The dimming panel assembly may further include a quarter wave plate 170 for polarizing incoming light into LHC or RHC polarized light. The quarter wave plate 170 in combination with linear polarizer 146 creates a circular polarizer that may be used to prevent a complete darkening of LCD and TV screens viewed through the NED device 100. The quarter wave plate 170 may be omitted in devices where screen darkening is not a concern. The linear polarizer 146 may be used in all embodiments to establish the incoming polarization of ambient light for the LC panels.

Figure 5:
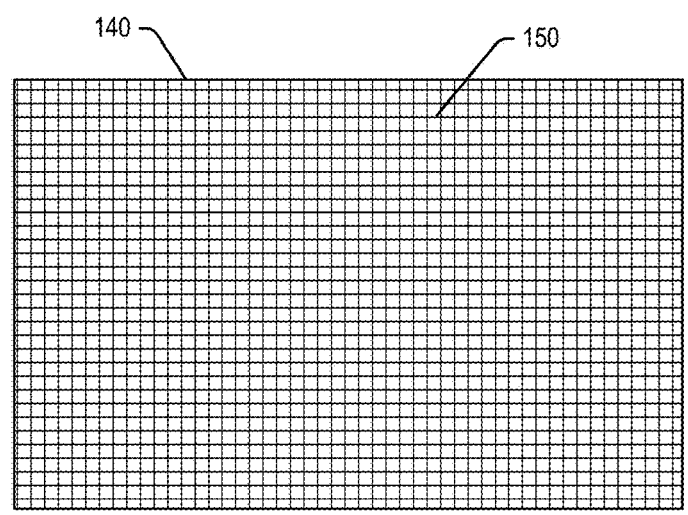
FIG. 5 is a front view of a pixelated monochromatic dimming panel assembly according to embodiments of the present technology.

FIG. 5 is a front view of a dimming panel assembly 140 showing individual pixels 150 (one of which is numbered) which make up the dimming panel assembly 140. The dimming panel assembly 140 is shown with a rectangular shape, but the shape need not be rectangular in further embodiments. Individual pixels 150 of the LC panels 144a, 144b are also shown in FIG. 4. In FIG. 5, the dark lines represent interpixel areas and are shown dark because these regions do not transmit light because they are covered with a light shield layer. The light shield pattern may be formed in a metal layer, such as aluminum, in a black matrix layer or other suitably opaque layer.

In NED device 100, the dimming panel assembly 140 may for example be 1 inch from the user's eyes 142. However, the images generated by the left and right optical assemblies 106 may be formed with a comfortable focus distance of greater than 0.5 meters. Thus, the light occlusion provided by the dimming panel assembly 140 is not in focus and may be blurry. However, by providing two spaced apart LC panels 144a and 144b, specific light vectors may be blocked, providing directional light control and clearer contrast for how the user visually perceives illuminated and occluded areas of a scene. For example, use of the two spaced apart LC panels 144a, 144b beneficially provides for accurate occlusion of light from specific angles from bright light sources in a scene and/or from behind AR holograms. These benefits are described in greater detail below.

In particular, in accordance with aspects of the present technology, light blocking by the LC panels 144 are split between the two panels 144a and 144b. All light from a scene received within the eye 142 of the wearer will pass through both LC panels 144a and 144b. If a light ray (also called a light vector herein) passes through a non-transmissive pixel on panel 144a and a non-transmissive pixel on panel 144b, the combination of non-transmissive pixels will result in complete blockage of that light vector from reaching the eye of a wearer. On the other hand, if a light vector passes through pixels on LC panels 144a, 144b where only one is non-transmissive, the light vector will be diminished by the LC panels, but light will still be transmitted through the dimming panel assembly 140 to the wearer. It is noted that non-transmissive pixels do not themselves block/diminish light. That happens in the second polarizer 148. In particular, non-transmissive pixels rotate a light polarization angle so that the light passing through one non-transmissive pixel will be partially blocked (absorbed) by the second polarizer 148, and light passing through two non-transmissive pixels will be completely blocked (absorbed) by the second polarizer 148. If a light vector passes through a pair of pixels on respective panels 144a, 144b where both are fully transmissive, the light vectors will not be diminished by the LC panels (though there will be light losses through the polarizers 146, 148).

Referring again to the example of FIG. 4, a light source 154 is captured in the field of view of the NED device 100. In embodiments, light sources above some predefined threshold luminance (such as light source 154 in this example) are identified and light from these sources may be blocked. In this simplified example, the processor determines that, at a given instant in time, light from source 154 will pass through pixel 150a on LC panel 144a and pixel 150b on panel 144b. The processor makes this determination using image and sensor data from the cameras of the NED device as explained below. Upon determining the pixels through which light vectors from light source 154 pass en route to the user's eye 142, these pixels (150a, 150b) may both be made non-transmissive, to thereby completely block the light vectors from light source 154.

On the other hand, light vectors 158 traveling from a real world object 160 near the light source 154 may pass through one of the non-transmissive pixels (e.g., pixel 150b), but not both non-transmissive pixels. Thus, light from the object 160 will be transmitted through the dimming panel assembly 140 (only partially diminished). In this way, providing two separate LC panels allows greater directional control over which areas of a scene ultimately get occluded from the user's view. In embodiments, the pixels in LC panel 144a may be aligned with the pixels in LC panel 144b. However, in further embodiments, the pixels in LC panel 144a may be offset from the pixels in LC panel 144b, along a one or both orthogonal axes. This can provide sub-pixel control over light occlusion transmitted through the dimming panel 140.

The operation of the dimming panel assembly to make a pixel transmissive or non-transmissive will now be explained in greater detail with reference to FIGS. 6-8. FIGS. 6-8 each show individual pixels 150 of LC panels 144a, 144b sandwiched between a pair of crossed polarizers 146 and 148. In general, even where the LC panel pixel pairs are both transmissive, the first polarizer 146 will inherently reduce some amount of light (e.g., 50%), transmitting ambient light that is selected by the polarizer's linear axis orientation. However, the LC panel pixels set the light polarization so that the second polarizer 148 will further diminish the light transmittance, or completely block it, as explained below.

Each of the pixels 150 of respective LC panels 144a, 144b are comprised of liquid crystals 162 between a pair of glass plates 164. A layer of Indium Tin Oxide (ITO) conductive film 166 is added to the surfaces of glass plates 164. In an example, the ITO is topped with an LC alignment layer, for example polyimide, that establishes the LC molecule alignment relative to the polarizer's axis. A polyimide alignment layer is mechanically rubbed to impart an alignment direction and pre-tilt angle. Alignment layers can also be formed by photolithography ("photo-alignment layer") or by growing inorganic materials ("inorganic alignment layer").

The ITO conductive film 166 is connected to a voltage source 168 enabling a voltage to be applied to the liquid crystals 162 between the glass plates 164. Each pixel electrode (ITO) may be driven by means of a few preparatory operations. For example, a visually linear digital grayscale value is passed through a look-up table to transform it to an output grayscale value. The look-up table may be based on a desired gamma, e.g. g2.2 when adhering to ITU-Rec 709 standards, and the liquid crystal material's inherent voltage-transmittance response curve. The resulting digital drive value is input to a D/A converter atop a column of display pixels. The D/A converter outputs a proportional voltage in response to the grayscale value. When the row driver enables a pixel's gating transistor, the D/A converter's voltage is applied to the pixel electrode and stored on the pixel's capacitor. The pixel LC orientation changes in response to the electrode voltage as explained below. The relative spacing of the respective layers shown in FIGS. 6-8 is for ease of understanding and may not be to scale.

A light vector from a scene enters the dimming panel assembly 140 through the first linear polarizer 146 (quarter wave plate 170 is not shown in FIGS. 6-8). The incoming light is polarized in a first linear direction. As shown in FIG. 6, without an applied voltage, the liquid crystals 162 of the two pixels 150a and 150b of respective LC panels 144a and 144b are each oriented in a helical pattern. The liquid crystals 162 of the first LC panel 144a are oriented so that, without an applied voltage, the linear polarized light from the first polarizer 146 is waveguided into the liquid crystals 162, which act as a light valve to twist the light phase through some first angle, for example 45°. The liquid crystals 162 of the second LC panel 144b are oriented so that, without an applied voltage, the polarized light from the first LC panel 144a is waveguided into the liquid crystals 162, which act as a light valve to twist the light phase through some angle, for example 45°. Thus, together, the two pixels 150a and 150b twist the linear polarized light 90° when inactive as shown in FIG. 6.

The second linear polarizer 148 is orthogonal to the first linear polarizer 146. Where the phase of the light passing through LC panels 144a, 144b has been twisted 90° as shown in FIG. 6, the light phase is aligned to linear polarizer 148 and passes through undiminished (aside from polarization and display fill factor losses) to the eye 142 of the wearer. In the example of FIG. 6, pixels 150 of both LC panels 144a, 144b are transmissive.

On the other hand, if a voltage is applied to the liquid crystals in one of the pixels 150a or 150b, the liquid crystals move from their helical orientation to an aligned orientation. For example, FIG. 7 shows an example where a voltage from voltage source 168 is applied to the liquid crystals 162 in pixel 150b, causing them to align. In this instance, light will be linearly polarized through the first polarizer 146 and twisted through an angle of for example 45° through the first pixel 150a as described above. However, the light will pass straight through the aligned liquid crystals of energized pixel 150b without twisting as shown in FIG. 7. In this case, the light through both pixels 150a and 150b will be partially aligned with the second polarizer 148, and some diminished component of the incoming light will pass through the second polarizer 148. In the example of FIG. 7, the pixel 150 of LC panel 144a is transmissive, and the pixel 150 of LC panel 144b is non-transmissive. While FIG. 7 shows a voltage applied to pixel 150b and not pixel 150a, the same result would occur if the voltage were applied to pixel 150a and not pixel 150b.

Further, where a voltage is applied to both pixels 150a and 150b through which the light passes, the liquid crystals 162 in both pixels would move from their helical orientation to an aligned orientation, as shown for example in FIG. 8. In this case, linearly polarized light from the first polarizer 146 would pass through both pixels 150a and 150b in respective LC panels without twisting. The linearly polarized light incident on the second linear polarizer 148 would thus be orthogonal and completely out of phase with second linear polarizer 148, and no light would pass through the second linear polarizer 148. In the example of FIG. 8, pixels 150 of both LC panels 144a, 144b are non-transmissive.

The dimming panel assembly 140 shown in FIGS. 4-8 provides highly controlled angular occlusion or transmittance of light from a captured scene. While pixels 150a and 150b appear to aligned with each other in the respective panels 144a, 144b (one in front of the other), it is understood that pixels 150a and 150b can be any two pixels in respective panels 144a, 144b through which light vectors may travel.

It can be seen in the above embodiments that the amount of light transmitted through the dimming panel assembly is a function of how the light gets twisted by the pair of pixels 150a, 150b between the crossed polarizers. Where the pair of pixels each rotate the light 45° for a total rotation of 90°, the light is aligned for maximum transmission through the second (exit) polarizer 148. Where the combined rotation of light is less than 90° but greater than 0°, light will be partially transmitted. And when the light is not rotated at all, light transmission will be blocked entirely. In equation form, the total transmission of light through dimming panel 140 of FIGS. 4-8 may be described as:

$$T\_total = T\_pol * \sin^2(PR\_lc_1 + PR\_lc_2), \quad (Eq. 1)$$

where:
$PR\_lc_1$ is the phase rotation through LC panel 144a,
$PR\_lc_2$ is the phase rotation through LC panel 144b, and
$T\_pol$ is the transmission due to the polarizers 146 and 148.

Figure 9:
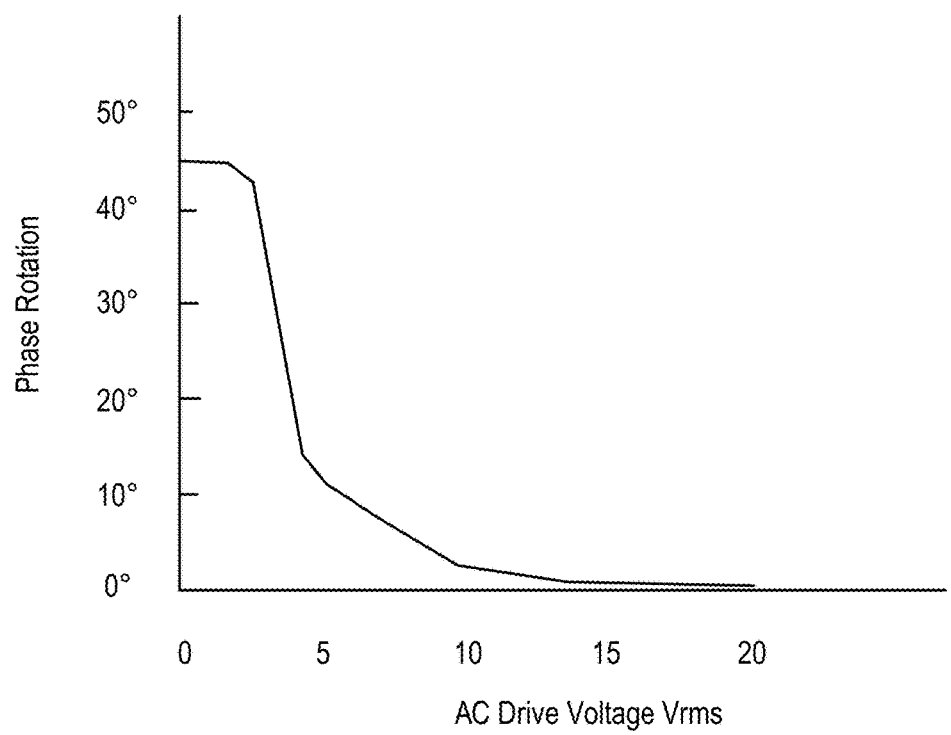
FIG. 9 is a graph of light rotation through the liquid crystals of the LC panels as a result of applied voltage.

The voltages applied to the liquid crystals in the pixels of one or both LC panels 144 may be binary: off (e.g., rotating light 45°) or on (e.g., no rotation). In other embodiments, a variable voltage may be applied to one or both pixels which will generate some degree of phase rotation that is proportional to the applied voltage. FIG. 9 is a graph showing phase rotation as a function of applied voltage for a pixel in one of the LC panels 144a, 144b. In the example shown, where no voltage is applied, each of the pixels 150 in the LC panels 144a, 144b rotates the light 45° (for a total of 90°). On the other hand, application of some drive voltage (e.g., 10-20 volts) results in a phase change of about 0°. The graph shown in FIG. 9 is by way of example only, and the LC panels may rotate light differently for a given drive voltage than is shown in FIG. 9.

The drive voltages for each pixel in both LC panels 144a, 144b are determined by a circuit in the display driver ASIC, converting the digital image set forth in pixel level opacity masks, one for each panel to pixel voltages that are applied to the ITO. Each pixels may be driven in a passive addressing mode or an active addressing mode. As is well known in the LCD art, active matrix LCDs have a TFT and hold capacitor circuit at each pixel to deliver the drive voltage on the pixel electrode. The pixel level opacity masks may be determined by the processor, for example once per frame. The opacity masks are comprised of dimming grayscale values representing drive voltages for respective pixels in the LC panels 144a, 144b. The dimming values may represent the determined drive voltages for each pixel as grey scale values (0-255), some number normalized between 1 and 100 or other scalar ranges.

The dimming values set by the processor for LC panel 144a are coordinated with the dimming values set by the processor for LC panel 144b. In particular, where the processor determines a particular light vector is to be blocked, the processor identifies the two pixels on respective LC panels 144a and 144b through which that light vector travels, and sets the dimming values for those pixels to both be non-transmissive. Where the processor determines a particular light vector is to be partially blocked, the processor identifies the two pixels on respective LC panels 144a and 144b through which that light vector travels, and sets the dimming values for those pixels so that one is transmissive and one is non-transmissive, or both are partially transmissive.

What light from a scene gets blocked, or partially blocked, may vary in different implementations of the present technology. However, in one example, light sources in a captured scene above some predefined brightness level may be blocked (as described above with respect to light source 154 in FIG. 4). Additionally, as explained in greater detail below, light from behind AR holograms may be blocked, and light from behind virtual drop shadows around those AR holograms may be partially blocked.

In order to block or partially block light by making certain pixels non-transmissive, the processor within control electronics 108 and/or processing unit 4 first needs to determine the pixel pairs on LC panels 144a and 144b through which light to be blocked/partially blocked travels en route to a user's eyes 142. Toward this end, the processor determines a scene map at a given instant in time using image data, for example from depth camera 110 and/or video camera 124 (FIG. 2). From this image data, the position of objects in the scene, such as light source 154 in FIG. 4, is known relative to the cameras 110 and/or 124. Additionally, the position of the dimming panel assembly 140 is calibrated relative to cameras 110 and/or 124, so the location of objects in the scene such as light source 154 is known relative to the dimming panel assembly 140 at a given instant in time.

Additional information is also needed to determine which pixels in the spaced LC panels 144 lie in the path between the user's eyes and objects in the scene such as light source 154. The instantaneous position of the user's head is given by the head tracking cameras 122. The instantaneous position of the NED device 100 and dimming panel 140 relative to the user's eyes 142 is given by the eye tracking cameras in the NED device 100.

Using this information, at some frame rate such as for example 30-360 frames per second, the processor is able to determine the pixels on both panels 144a and 144b through which light vectors from the scene travel. For example, referring back to FIG. 4, using the image data from the cameras in the NED device 100, the processor is able to determine that light vectors from the light source 154 travel through pixels 150a and 15b en route to the user's eyes 142. If it is determined that light from light source 154 is above the predefined threshold, then both pixels 150a and 150b may be energized (as indicated by thickened pixel lines 150a and 150b) and the dimming panel assembly 140 will completely block light from the light source 154.

In the embodiment described above for FIGS. 6-8, the liquid crystals arranged in a helical configuration that rotates light in the absence of an applied voltage. It is understood that other configurations are possible to achieve the desired transmission or non-transmission of light through pixel pairs. For example, the polarizers 146, 148 may be aligned in parallel, instead of orthogonal, to each other. In this case, light would be blocked by the parallel polarizers 146, 148 in the absence of an applied voltage, and would be transmitted upon applying a voltage to one or both of the pixels in LC panels 144a, 144b.

Similarly, instead of being crossed (orthogonal), the polarizers 146, 148 may be aligned. For example, one of the first and second polarizers 146, 148 in FIG. 6 may be rotated 90°. In this case, light rotated 90° by the liquid crystals of the first and second pixels 150a, 150b would be completely blocked by the second polarizer 148.

As noted above, providing a pair of spaced LC panels 144a, 144b in the dimming panel assembly 140 provides advantages of directional ambient light blocking and pixel-by-pixel controlled light occlusion within a scene. However, in further embodiments, the dimming panel assembly may include a single LC panel 144. Such an embodiment will now be described with respect to FIGS. 10-12.

Figure 10:
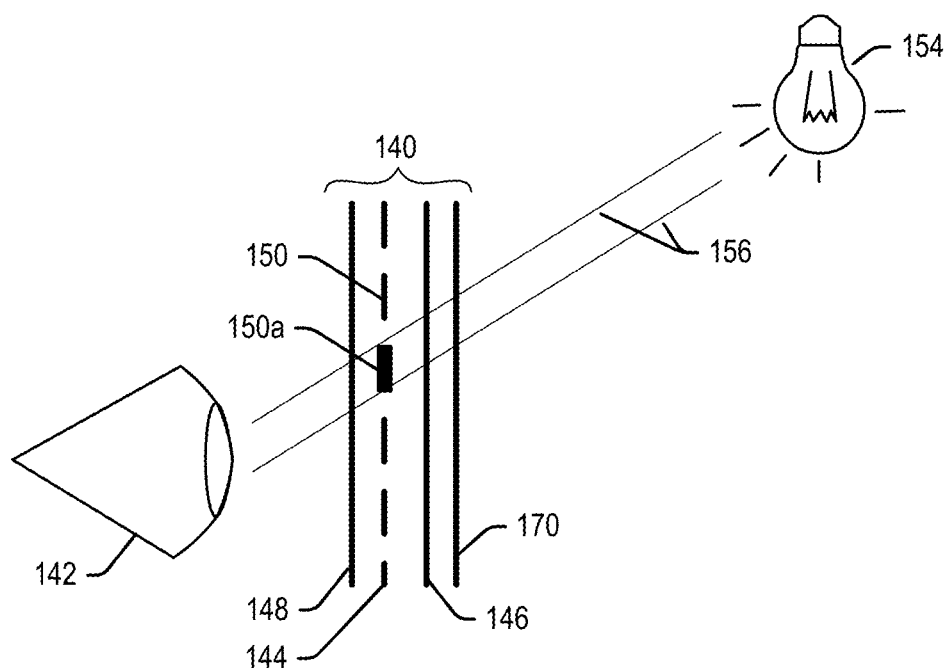
FIG. 10 is an illustration of a pixelated monochromatic dimming panel assembly according to an alternative embodiment of the present technology.

FIG. 10 illustrates the dimming panel assembly 140 of the NED device 100, with the optical assemblies 106 and visor 104 omitted for clarity. The dimming panel assembly 140 in this embodiment includes a single pixelated LC panel 144 sandwiched between the first and second linear crossed polarizers 146 and 148. The dimming panel assembly 140 may further include a quarter wave plate 170 as described above. FIG. 10 shows a light source 154 captured in the field of view of the NED device 100. In embodiments, light from a source 154 above some predefined threshold luminance is identified and may be blocked.

In order to do this, the processor determines the pixel(s) 150 on LC panel 144 through which light from the identified source 154 passes en route to a user's eyes 142 as described above. In the simplified example of FIG. 10, light rays 156 from light source 154 will pass through pixel 150a on LC panel 144 en route to the user's eye 142. If it is determined that light from light source 154 is above the predefined threshold, then pixel 150a may be energized (as indicated by thickened pixel lines 150a) and the dimming panel assembly 140 will completely block light from the light source 154 through the pixel 150a.

Figure 11:
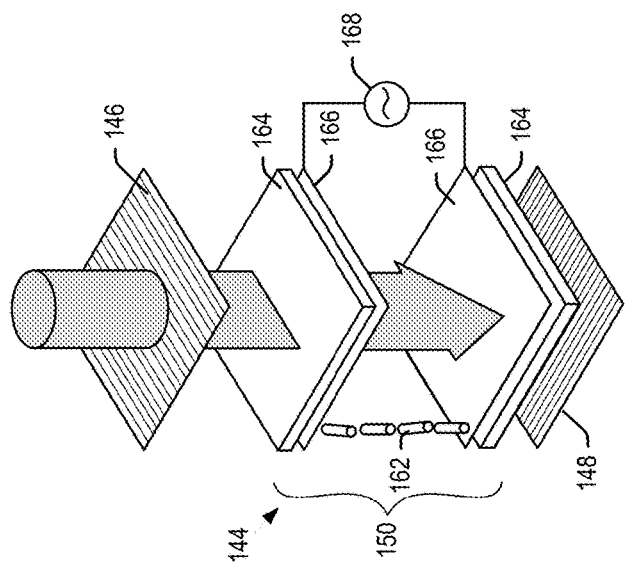
Figure 12:
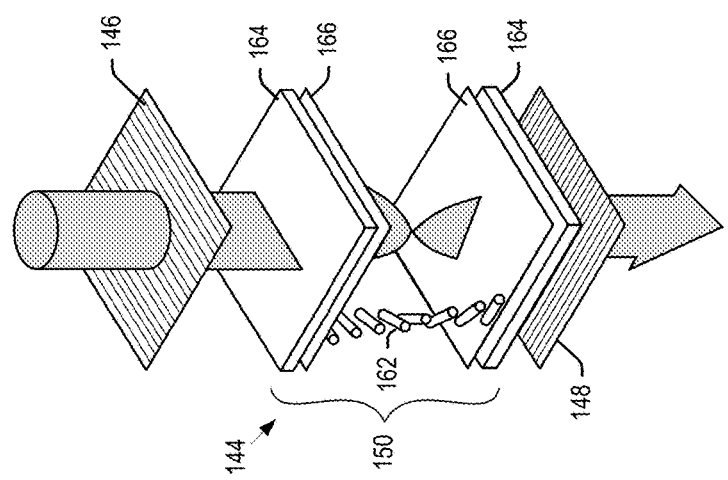

FIGS. 11-12 both show an individual pixel 150 of the LC panel 144 sandwiched between a pair of crossed polarizers 146 and 148. As above, the pixel 150 is comprised of liquid crystals 162 between a pair of glass plates 164 having an ITO conductive film layer 166. The ITO conductive film 166 is connected to a voltage source 168 enabling a drive voltage to be applied to the liquid crystals 162 between the glass plates 164.

The embodiment of FIGS. 11 and 12 operate similarly to the embodiments of FIGS. 6 and 8. FIG. 11 shows the pixel 150 rotating the incoming polarized light 90° in the absence of a drive voltage for transmission through the second polarizer 148. FIG. 12 shows the pixel 150 transmitting the incoming polarized light without rotation upon an applied drive voltage so that the light is completely blocked (absorbed) by the second polarizer 148. As above, liquid crystals and/or crossed polarizers may be rearranged so that light is transmitted in the absence of a drive voltage, and is blocked upon receipt of a drive voltage.

The size of the pixels on LC panels 144a, 144b may be set based on an optimization of competing factors. On the one hand, smaller pixels in general provide greater resolution and sharpness to occluded areas of a scene. On the other hand, pixels that are very small suffer from disadvantages such as image distortion due to diffraction at pixel edges and multiple visible diffractive orders. Additionally, the area of inactive gaps between pixels may become relatively large as the size of the pixels becomes smaller. The light blocked by the inactive gaps will restrict the maximum transmittance level attainable. Pixels sizes of between 140 µm and 600 µm may be selected, depending on how the competing factors are prioritized in a given use of the NED device 100. The pixels may be smaller than 140 µm and larger than 600 µm in further embodiments.

The embodiments of FIGS. 6-12 illustrate a dimming panel assembly 140 comprising LC panels and polarizers for dimming light on a pixel-by-pixel basis. However, it is understood that the dimming panel assembly 140 may comprise other or additional components, or operate by different technologies, for dimming light on a pixel-by-pixel basis.

As one example, the LC panel(s) may be formed as guest-host display panels. Guest host display panels are similar to the above-described LC panels, but further include dichroic dye within the liquid crystal matrix. Such displays absorb ambient light with dye molecules. This provides an advantage that the cross polarizers 146, 148 may be omitted and the transmission losses associated with the polarizers avoided. Additionally, the diffraction and ambient light leakage through the inactive gaps between pixels can still be handled by adding an absorbing or light blocking layer over the inactive gaps. For example, additional dye can be stenciled on the LC panels or added to photoresist and patterned to block light through the inter-pixel gaps. Alternatively, a metal light shield layer can be patterned over the inter-pixel gaps to block ambient light.

In further embodiments, electrochromic and electrowetting displays may also be used. These also do not use polarizers and do not suffer the transmission losses associated with polarizers. Moreover, as with guest-host panels, ambient light leakage through inactive areas can be handled by adding an absorbing or blocking layer over the inactive gaps between pixels.

Figure 13:
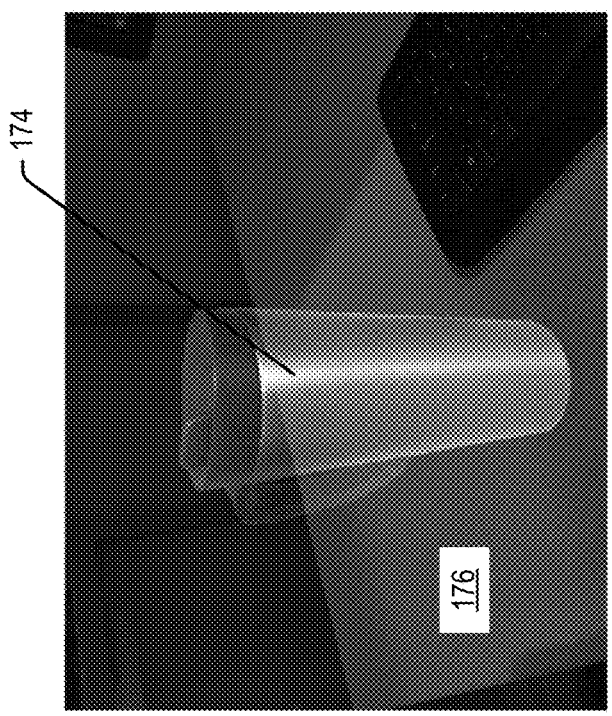
FIG. 13 is a view of an AR hologram displayed with a conventional NED device.

With the opacity masks determined by the processor, the above-described embodiments of dimming panel assembly 140, including one or two LC panels 144, are effective at removing light sources from a scene that are determined to be above a threshold level. Additionally, the opacity masks and dimming panel assembly 140 may be used to give greater contrast and more realism to AR holograms displayed against a real world background. For example, FIG. 13 is a display as seen through a conventional NED device of an AR hologram 174 (a virtual mug) sitting on a real world desk 176. The background light is low to maximize the contrast of the AR hologram. However, the desk is still visible through the AR hologram, making the hologram appear less realistic.

In accordance with further aspects of the present technology, values may be set within the opacity mask or masks (where there are two LC panels 144) to block the light from pixels located behind AR holograms within a scene. In particular, AR holograms are assigned positions in real world space. The positions of any AR holograms may be identified or determined by the processor within the scene map. Then, using the scene map, and the head position and eye tracking data as described above, the processor may determine which pixels on the one or two LC panels 144 are positioned behind the AR hologram(s). Dimming values may be set in the opacity mask(s) which block light from passing through these pixels.

Figure 14:
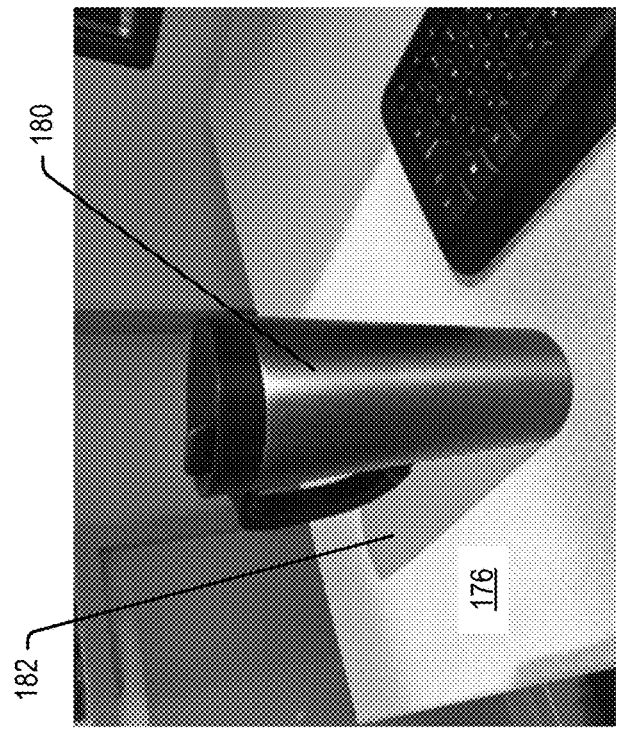
FIG. 14 is a view of the same AR hologram shown in FIG. 12 displayed with an NED including a monochromatic dimming panel assembly according to embodiments of the present technology.

The goal is an AR hologram 180 as shown in FIG. 14. As the light from behind the AR hologram is blocked, the desk 176 is not visible through the AR hologram 180. Thus, the AR hologram 180 may be displayed with a high degree of contrast and with a more realistic appearance compared to the AR hologram 174 shown in FIG. 13. As the AR hologram 180 may be displayed with a high contrast relative to the background, the background may also be displayed with a brighter, more natural light.

FIG. 14 also shows a virtual drop shadow 182 added to the AR hologram 180. The position of the virtual drop shadow 182 may be calculated by the processor, using for example a known location of one or more light sources in the scene relative to the AR hologram 180, and/or how shadows appear off of other real world objects captured in the scene.

The shape of the virtual drop shadow 182 may be determined from a projection of the AR hologram onto a surface where the drop shadow is to be displayed (on desk 176 in this example).

Once the position and shape of the virtual drop shadow 182 has been determined, the pixels in the dimming panel assembly corresponding to the position and shape of the drop shadow may be assigned values in the opacity mask which reduce the amount of light transmitted at those pixels. The light may not be blocked completely, but the light may be diminished to generate the shadow effect shown for example in FIG. 14. The drop shadow 182 is added, but the desk is still partially visible through the shadow. The amount by which the light may be diminished may be determined in the opacity mask based on the brightness of the one or more light sources in the scene, and/or an analysis of real world shadows captured in the scene. Providing a virtual drop shadow 182 to the AR hologram 180 further enhances the realistic displayed appearance of the AR hologram 180. It is also possible to add light reflections on surfaces of AR holograms in a similar manner. As mentioned above, the viewer may see a blurred version of the shadow and opacity masks, the amount of blur in proportion to size of the viewer's pupil diameter and the distance of the dimming panel assembly from the viewer's eyes.

Figure 15:
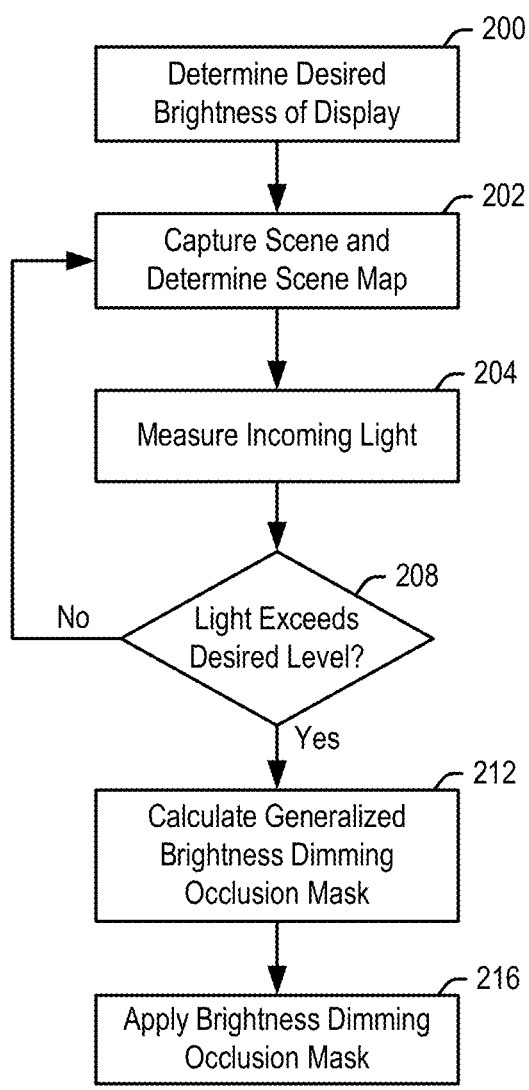
FIGS. 15 and 16 are flowcharts showing the operation of different embodiments of the present technology.
Figure 16:
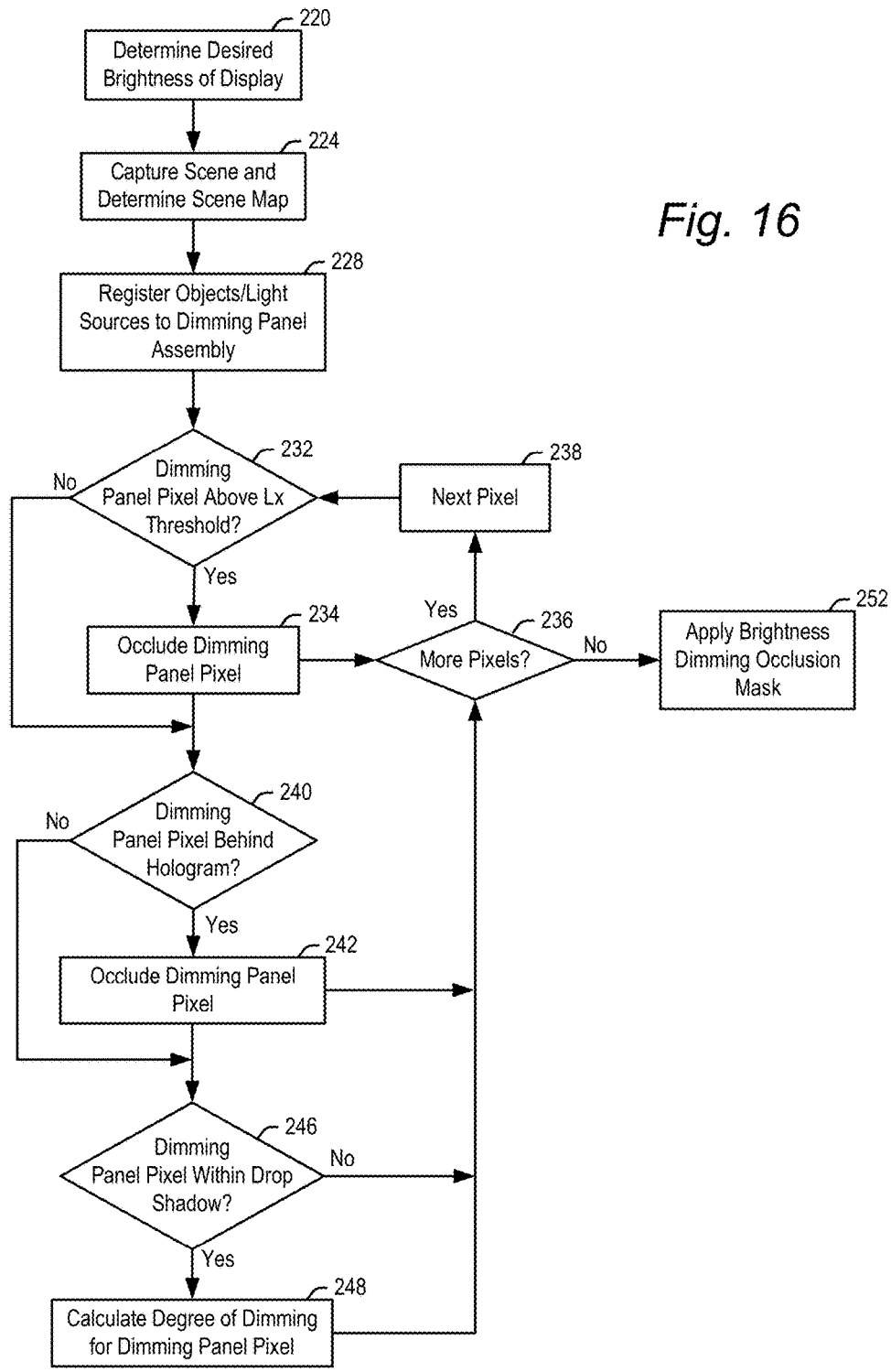

As noted, the dimming panel assembly 140 may be used in different ways to control the amount of light from a scene transmitted to the eyes of a wearer. FIG. 15 is a flowchart illustrating a method for controlling the overall luminance transmitted through the dimming panel assembly 140. FIG. 16 is a flowchart describing a method of generating one or more pixel level opacity masks for selectively setting the luminance of individual pixels within the dimming panel assembly 140.

Referring initially to FIG. 15, in step 200, the processor determines a desired brightness of the display, i.e., how much of the general light from a scene to transmit to the eyes of the wearer. This may be based on the level of ambient brightness reported by an ambient light sensor and/or by user input conveying a display brightness preference. Some predefined standard luminance may be used. Alternatively, the amount of luminance may be based at least in part on the amount of power remaining in the NED device 100 battery. For example, if the battery power is low, AR holograms may be displayed with less brightness to conserve battery power, and it may be desirable to reduce the brightness of the display to maintain contrast of the AR holograms.

In step 202, the processor receives the image data from the various cameras and sensors in the NED device 100 and forms a scene map including real-world objects and light sources, as well as AR holograms. As noted above, the scene map may be generated at a frame rate of between 30 to 360 frames per second, though it may be generated more or less frequently than that in further embodiments.

In step 204, the processor may receive a measurement of light transmitted through the visor 104. As described above, the visor may include a photochromic coating or material which turns darker in bright sunlight. Light transmittance feedback circuit 134 may provide the amount of light which gets transmitted through the visor and photochromic material to the dimming panel assembly 140.

In step 208, the processor may determine whether the incoming light measured in step 204 exceeds the desired brightness level of the display set in step 200. If not, no further dimming is required by the dimming panel assembly, and the processor may return to step 202 to generate a new scene map, which may change as a user moves or the surrounding environment changes.

If, on the other hand, the brightness level of the display exceeds the desired brightness level in step 208, a generalized brightness dimming opacity mask may be generated in step 212. The generalized brightness dimming opacity mask may include a uniform dimming value which is applied to all pixels in one or both LC panels 144a, 144b, or to the pixels in the single LC panel 144 for embodiments including a single LC panel. The uniform dimming value may be determined by the processor based on the amount by which the incoming light measured in step 204 exceeds the desired light level. In step 216, the uniform dimming value in the brightness dimming opacity mask(s) may be applied to the pixels in the dimming panel assembly to lower the overall amount of light transmitted from the scene to the eyes of the wearer.

The generalized brightness dimming opacity mask may be integrated as a baseline to the pixel level opacity mask described below with respect to FIG. 16. Alternatively, the generalized brightness dimming opacity mask may be used by itself to set an overall brightness density.

FIG. 16 illustrates a method of forming and applying pixel level opacity masks having variable dimming values for different pixels of the dimming panel assembly. Step 220 (determining the desired brightness of the display) and step 224 (capturing the scene and developing scene map) may be the same as steps 200 and 202 described above with respect to FIG. 15. In step 228, the processor can register objects in the scene to the dimming panel assembly. As noted above, such registration determines which pixels in the dimming panel assembly correlate to the positions of real and virtual objects in the scene. The registration in step 228 may be performed using image data from one or more of the above-described cameras and sensors in the NED device 100.

Beginning in step 232, the processor sets a variable dimming value for respective pixels in the opacity mask(s) on a pixel-by-pixel basis. As indicated above, the dimming value may represent the drive voltage to be applied to individual pixels. Where the dimming panel assembly 140 includes a single LC panel 144, the processor may develop a single opacity mask. Where the dimming panel assembly 140 includes a pair of spaced LC panels 144a, 144b, the processor may develop a pair of opacity masks, one for each dimming panel. In developing the pair of opacity masks, the processor may initially set values for all pixel pairs lying along light vectors to be occluded (coming from a bright light source or positioned behind an AR hologram). The mid-range dimming values of partially dimmed pixel pairs (such as those positioned behind a virtual drop shadow) may be set entirely within one opacity mask. Alternatively, mid-range dimming values of partially dimmed pixel pairs may be split between the pixel pairs in both LC panels according to defined heuristic rules.

In step 232, the processor may consider a first pixel in one of the LC dimming panels and determine whether the pixel lies along a light vector to a light source which exceeds some predefined luminance threshold. If so, the dimming value is set for that pixel in step 234 to make it non-transmissive. As described above respect to FIGS. 6-8, this may be accomplished by energizing the pixel with a predefined drive voltage. The processor may then check if there are more pixels to set in the opacity mask in step 236. If so, the next pixel is considered in step 238. If not, the opacity mask is completed and may be applied in step 252.

If the pixel under consideration did not have a luminance above a threshold in step 232, the processor may next determine in step 240 whether the pixel lies behind an AR hologram. If so, the dimming value is set for that pixel in step 242 to make it non-transmissive. The processor may then check if there are more pixels to set in the opacity mask in step 236. If so, the next pixel is considered in step 238. If not, the opacity mask is completed and may be applied in step 252.

If the pixel under consideration is not behind a hologram in step 240, the processor may next determine in step 246 whether the pixel lies behind a virtual drop shadow to be added to an AR hologram. The shape and position of virtual drop shadows may be determined as described above. If the pixel lies behind a virtual drop shadow, a mid-range dimming value may be set for that pixel in step 248 to display the desired virtual drop shadow associated with an AR hologram. Alternatively, the processor may check the partial illumination of the drop shadow has already been set in the pixel(s) of the opacity mask for the other LC panel. If so, the pixel under consideration in step 246 may be set as transmissive.

The processor may then check if there are more pixels to set in the opacity mask in step 236. If so, the next pixel is considered in step 238. If not, the opacity mask is completed and may be applied in step 252. It is understood that FIGS. 15 and 16 are by way of example only, and one or more steps in these flowcharts may be altered or omitted, or other steps performed. For example, with respect to FIG. 16, where the processor has imaging capabilities, then the AR object may be given a flood fill, then eroded to shrink its size to compensate for the size change with visual blurring. Other changes are contemplated.

The above steps may be performed each frame to set the dimming values for the opacity mask for each LC panel 144 in the dimming panel assembly 140. The steps of FIG. 16 may also be used to create the generalized opacity mask with common dimming values described above with respect to FIG. 15. In particular, the dimming values in the generalized opacity mask may be applied to all pixels as a baseline, and pixels may be further dimmed after execution of the steps of FIG. 16.

As noted above, the NED device 100 may further be used in virtual reality scenarios where no real world light is admitted. In such embodiments, the opacity mask(s) may be set to block all light from the outside world from passing through the dimming panel assembly 140.

In summary, in one example, the present technology relates to A near eye display (NED) device, comprising: a passive light reduction component within the NED device for automatically reducing an amount of light transmitted through the NED device; and an active light reduction component within the NED device and working in together with the passive light reduction component, the active light reduction component controlling an amount of light transmitted through the NED upon receipt of a voltage from a power supply.

In another example, the present technology relates to a near eye display (NED) device, comprising: a visor including a photochromic material on or within the visor, the photochromic material blocking or absorbing an amount of light to prevent passage through the visor; a dimming panel assembly, comprising: a panel comprising a pixel that is transmissive or non-transmissive of light, based at least in part on a drive voltage applied to the pixel; and a processor for determining the drive voltage based at least in part on whether the dimming panel is configured to block light from passing through the dimming panel assembly along a path comprising the pixel.

In a further example, the present technology relates to a near eye display (NED) device, comprising: a plurality of cameras providing data about a scene captured by the cameras and a wearer of the NED device; a visor including a photochromic material on or within the visor, the photochromic material blocking or absorbing an amount of light to prevent passage through the visor; a dimming panel assembly, comprising: first and second polarizers; a panel between the first and second polarizers, the panel comprising a set of pixels; and a processor configured to: determine an opacity mask including a set of dimming values for pixels in the set of pixels, the set of dimming values determining whether the pixels in the set of pixels are transmissive or non-transmissive; wherein the set of dimming values are based at least in part on an amount of light blocked by the photochromic material.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

I claim:

1. A near eye display (NED) device, comprising:
   a passive light reduction component within the NED device configured to automatically reduce an amount of light transmitted through the NED device;
   an active light reduction component within the NED device and working together with the passive light reduction component, the active light reduction component configured to control an amount of light transmitted through the NED device upon receipt of a voltage from a power supply, wherein the active light reduction component comprises a dimming panel assembly including a liquid crystal (LC) panel;
   an optical assembly positioned in front of the dimming panel assembly; and
   a processor configured to:
      determine a position of an augmented reality (AR) hologram displayed on the optical assembly,
      determine a pixel on the LC panel behind the AR hologram, and
      control a voltage applied to the pixel to prevent transmission of light through the dimming panel assembly along a path comprising the pixel.

2. The NED device of claim 1, wherein the processor is further configured to:
   determine an amount of light transmitted through the passive light reduction component, and
   control the active light reduction component to block an additional amount of light based on the amount of light transmitted through the passive light reduction component.

3. The NED device of claim 1, further comprising:
   a light transmittance feedback circuit for measuring the amount of light transmitted through the passive light reduction component; and
   wherein the processor is further configured to:
      receive feedback from the light transmittance feedback circuit of the amount of light transmitted through the passive light reduction component, and control the active light reduction component to block an additional amount of light based on the amount of light transmitted through the passive light reduction component.

4. The NED device of claim 1, wherein the active light reduction component further comprises polarizer panels, and wherein the LC panel is sandwiched between the polarizer panels.

5. The NED device of claim 4, wherein the processor is further configured to:
   determine a position of a light source in a scene within view of the NED device;
   determine a pixel on the LC panel through which a light vector travels from the light source; and
   control a voltage applied to the pixel to prevent transmission of the light vector through the dimming panel assembly.

6. The NED device of claim 1, wherein the passive light reduction component comprises a photochromic material which darkens and blocks wavelengths of light.

7. The NED device of claim 6, further comprising a visor, the photochromic material being coated onto the visor or integrated into the visor.

8. A near eyed display (NED) device, comprising:
   a passive light reduction component within the NED device configured to automatically reduce an amount of light transmitted through the NED device;
   an active light reduction component within the NED device and working together with the passive light reduction component, the active light reduction component controlling an amount of light transmitted through the NED device upon receipt of a voltage from a power supply, wherein the active light reduction component comprising a dimming panel assembly including polarizer panels and a liquid crystal (LC) panel sandwiched between the polarizer panels; and
   an optical assembly positioned in front of the dimming panel assembly; and
   a processor configured to:
      determine a position of a virtual drop shadow extending from an augmented reality hologram displayed by the optical assembly;
      determine a pixel on the LC panel aligned behind the virtual drop shadow; and
      control a voltage applied to the pixel so that the pixel partially blocks transmission of light through the dimming panel assembly.

9. The NED device of claim 8, wherein the processor is further configured to:
   determine an amount of light transmitted through the passive light reduction component, and
   control the active light reduction component to block an additional amount of light based on the amount of light transmitted through the passive light reduction component.

10. The NED device of claim 8, further comprising:
    a light transmittance feedback circuit for measuring the amount of light transmitted through the passive light reduction component; and
    wherein the processor is further configured to:
       receive feedback from the light transmittance feedback circuit of the amount of light transmitted through the passive light reduction component, and
       control the active light reduction component to block an additional amount of light based on the amount of light transmitted through the passive light reduction component.

11. The NED device of claim 8, wherein the passive light reduction component comprises a photochromic material which darkens and blocks wavelengths of light.

12. The NED device of claim 11, further comprising a visor, the photochromic material being coated onto the visor or integrated into the visor.

13. A near eye display (NED) device, comprising:
    a plurality of cameras providing data about a scene captured by the cameras and a wearer of the NED device;
    a visor including a photochromic material on or within the visor, the photochromic material blocking or absorbing an amount of light to prevent passage through the visor;
    a dimming panel assembly, comprising:
       first and second polarizers;
       a panel between the first and second polarizers, the panel comprising a set of pixels; and
    a processor configured to:
       determine an opacity mask including a set of dimming values for pixels in the set of pixels, the set of dimming values determining whether the pixels in the set of pixels are transmissive or non-transmissive;
       wherein the set of dimming values are based at least in part on an amount of light blocked by the photochromic material.

14. The NED device of claim 13, further comprising a light transmittance feedback circuit for measuring the amount of light transmitted through the photochromic material and communicating the amount to the processor.

15. The NED device of claim 13, a camera of the plurality of cameras detecting a light source in the scene, the processor setting a dimming value for a pixel in the set of pixels, so that the dimming panel blocks a light vector from the light source passing through the pixel.

16. The NED device of claim 15, further comprising an optical assembly configured to be between the dimming panel assembly an eyes of a wearer when the NED device is worn, the optical assembly capable of generating an augmented reality (AR) hologram, the processor identifying a pixel from the set of pixels that is behind the AR hologram, the processor setting a dimming value for the pixel so that the pixel is non-transmissive.

17. The NED device of claim 16, the optical assembly further capable of generating a virtual shadow extending from the AR hologram, the processor identifying a pixel from the set of pixels that is behind the virtual shadow, the processor setting a dimming value for the pixel so that one of the pixel is transmissive and one of the first and second pixels is non-transmissive.

18. The NED device of claim 16, wherein the processor determines an opacity mask including a set of dimming values which uniformly reduces the amount of light admitted through all pixels by at least a threshold amount to enhance a contrast of the AR hologram.

* * * * *